(12) United States Patent
Kaneko

(10) Patent No.: US 10,275,133 B2
(45) Date of Patent: Apr. 30, 2019

(54) MOVING IMAGE PLAYBACK METHOD, MOVING IMAGE PLAYBACK DEVICE, AND COMPUTER READABLE STORAGE MEDIUM STORING A MOVING IMAGE PLAYBACK PROGRAM

(71) Applicant: Taro Kaneko, Tokyo (JP)

(72) Inventor: Taro Kaneko, Tokyo (JP)

( * ) Notice: Subject to any disclaimer, the term of this patent is extended or adjusted under 35 U.S.C. 154(b) by 196 days.

(21) Appl. No.: 15/304,178

(22) PCT Filed: Jan. 12, 2016

(86) PCT No.: PCT/JP2016/050639
§ 371 (c)(1),
(2) Date: Oct. 14, 2016

(87) PCT Pub. No.: WO2016/114249
PCT Pub. Date: Jul. 21, 2016

(65) Prior Publication Data
US 2017/0031573 A1    Feb. 2, 2017

(30) Foreign Application Priority Data

Jan. 16, 2015    (JP) ................................ 2015-018824

(51) Int. Cl.
*G06F 3/0484*        (2013.01)
*G06F 3/0481*        (2013.01)
(Continued)

(52) U.S. Cl.
CPC ........ *G06F 3/04845* (2013.01); *G06F 3/0486* (2013.01); *G06F 3/04883* (2013.01);
(Continued)

(58) Field of Classification Search
CPC ... G06F 3/04845; G06F 3/0481; G06F 3/0488
See application file for complete search history.

(56) References Cited

U.S. PATENT DOCUMENTS 8,745,525 B1 *  6/2014  Roskind .............. G06F 3/04883
                                                    715/788
2014/0043534 A1 *  2/2014  Nakaoka ................ H04N 5/445
                                                    348/563
(Continued)

FOREIGN PATENT DOCUMENTS

EP       2784645 A2    10/2014
JP    2005124169 A     5/2005
(Continued)

OTHER PUBLICATIONS

"Copy and Paste a File From One Locaton to Another", published on Dec. 20, 2005 to https://www.ctdlc.org/remediation/copypaste. html, retrieved Jun. 23, 2018.*
(Continued)

*Primary Examiner* — Shourjo Dasgupta
(74) *Attorney, Agent, or Firm* — Lucas & Mercanti, LLP

(57) ABSTRACT

Provided is a moving image playback method, a moving image playback device, and a computer readable storage medium which stores a moving image playback program which enable a plurality of moving images to be played back simultaneously on a single smart device, and enable the plurality of moving images to be moved and magnified/reduced within the smart device screen. For example, a moving image playback device of the present invention includes an operation part that performs an operation related to playback of a moving image; a control part that controls a request from the operation part; and a display part that displays the moving image according to the control of the control part. The control part generates a first moving image display view which is a movable region of a moving image to be projected in the display part; generates a second moving image display view which enables the moving image to be moved on the first moving image display view; plays back the moving image on the second moving image
(Continued)

display view; obtains, on the basis of coordinates of the four corners of the second moving image display view, a pre-movement position of the moving image selected via the operation part; calculates a post-movement position of the moving image that was moved via the operation part by reflecting an amount of movement of the moving image on the coordinates of the four corners of the second moving image display view; and displays the moving image at the post-movement position.

12 Claims, 12 Drawing Sheets

(51) Int. Cl.
G06F 3/0488 (2013.01)
G11B 27/00 (2006.01)
H04N 21/431 (2011.01)
H04N 21/472 (2011.01)
G06F 3/0486 (2013.01)
H04N 21/414 (2011.01)

(52) U.S. Cl.
CPC ............ *G11B 27/00* (2013.01); *G06F 3/0488* (2013.01); *G06F 2203/04806* (2013.01); *G06F 2203/04808* (2013.01); *H04N 21/41407* (2013.01); *H04N 21/4312* (2013.01); *H04N 21/47217* (2013.01)

(56) References Cited

U.S. PATENT DOCUMENTS

2015/0121300 A1* 4/2015 Wang .................. G06F 3/04845
715/790
2015/0248198 A1* 9/2015 Somlai-Fisher ...... G06F 3/0481
715/716

FOREIGN PATENT DOCUMENTS

| | | |
|---|---|---|
| JP | 2007509519 A | 4/2007 |
| JP | 2013140196 A | 7/2013 |
| JP | 2015158777 A | 9/2015 |
| WO | 2012048007 A2 | 4/2012 |
| WO | 2014057814 A1 | 4/2014 |

OTHER PUBLICATIONS

International Search Report dated Jul. 14, 2015 for PCT/JP2016/050639 and English translation.
Extended European Search Report dated Jun. 19, 2018 from corresponding European Application No. EP 16737320.8.

* cited by examiner

MOVING IMAGE PLAYBACK METHOD, MOVING IMAGE PLAYBACK DEVICE, AND COMPUTER READABLE STORAGE MEDIUM STORING A MOVING IMAGE PLAYBACK PROGRAM

CROSS REFERENCE TO RELATED APPLICATION

This Application is a 371 of PCT/JP2016/050639 filed on Jan. 12, 2016, which, in turn, claimed the priority of Japanese Patent Application No. 2015-018824 filed on Jan. 16, 2015, both applications are incorporated herein by reference.

TECHNICAL FIELD

The present invention relates to a moving image playback method, a moving image playback device, and a computer readable storage medium which stores a moving image playback program. More particularly, the present invention relates to a moving image playback method, a moving image playback device, and a computer readable storage medium which stores a moving image playback program in which the display position and size of a moving image in playback can be changed.

BACKGROUND ART

In a conventional smart device application, it has been possible to perform movement by a drag operation (a movement operation using one finger) and magnification/reduction by a pinch operation (a movement operation using two fingers) of single still images and multiple still images. However, a similar function did not exist for single moving images or multiple moving images. Thus, for example, in order to view and compare in real time news programs which are distributed as live moving images, it was necessary to prepare a plurality of televisions or smart devices. When news which demands urgency has occurred, if a broadcasting station does not prepare multiple televisions or smart devices, then the station cannot confirm the broadcast content of other stations, and users/viewers similarly cannot confirm in real time what is being broadcast on multiple broadcasting stations.

Meanwhile, some ideas regarding the operation of a moving image to be played back on a smart device have been proposed (for example, refer to Patent Literature 1). In detail, if a prescribed position within a display area of a moving image is double tapped, the size of the moving image in playback is reduced along with a reduction of the display area, and if the reduced display area is dragged, the moving image in playback moves along with the movement of the display area. Further, if a prescribed position within the display area of a moving image is double tapped to reduce the size of the moving image in playback, two moving images in playback are arranged in the center of the screen.

PRIOR ART LITERATURE

Patent Literature

Patent Literature 1: JP 2015-158777 A

SUMMARY OF INVENTION

Problem to be Solved by Invention

However, the conventional ideas discussed above are merely for facilitating operations such as playback, stop, fast forward or rewind, and the like of a moving image. In other words, in the above-described publicly-known technology, the size of the display area and the size of the moving image are reduced and the moving image is moved by dragging in order to overlap the moving image in playback over an operation button on the touch panel so as to perform the above-mentioned operations. Therefore, when the moving image is dropped on the operation button (when dragging of the moving image is completed), the display area and the moving image are automatically returned to the center position of the display screen which is their original position. Thus, a plurality of moving images cannot be compared at a desired position and size on the screen.

In our information society, a mechanism is needed by which a user can flexibly set and modify the position and size of a moving image to be played back on a screen in accordance with the purpose of playback/viewing the moving image (for example, analysis of information or a presentation) and the circumstances of the user (for example, dominant hand or habits).

Thus, a first object of the present invention is to provide a moving image playback method, a moving image playback device, and a computer readable storage medium which stores a moving image playback program which enable a plurality of moving images to be played back simultaneously on a single smart device, and enable the plurality of moving images to be moved and magnified/reduced within the smart device screen. Further, a second object of the present invention is to provide a moving image playback method, a moving image playback device, and a computer readable storage medium which stores a moving image playback program which enable sound switching of a plurality of moving images.

Means for Solving the Problem

The present invention relates to moving a moving image playback screen in a state in which the playback screen is pressed down as well as magnifying/reducing the playback screen by pressing down and moving the playback screen with two or more fingers in an application for a smart device.

The present invention also relates to simultaneous playback of a plurality of moving images and sound switching by pressing down a specific playback screen in an application for a smart device.

The present invention further relates to playback movement by pressing down and moving a specific playback screen in a state in which a plurality of moving images are displayed, as well as magnification/reduction of a playback screen by pressing down and moving with two or more fingers in an application for a smart device.

More specifically, the present invention is a moving image playback method executed by a computer, the method including: generating a first moving image display view which is a movable region of a moving image to be projected in a display part; generating a second moving image display view which enables the moving image to be moved on the first moving image display view; playing back the moving image on the second moving image display view; obtaining, on the basis of the coordinates of the four corners of the second moving image display view, a pre-movement position of the moving image selected via an operation part; calculating a post-movement position of the moving image that was moved via the operation part by reflecting the amount of movement of the moving image on the coordinates of the four corners of the second moving image display view; and displaying the moving image at the post-movement position.

Preferably, the operation part is a touch-sensitive surface, and the pre-movement position of the moving image selected by a touch operation at one or more points via the operation part is obtained on the basis of the coordinates of the four corners of the second moving image display view, the post-movement position of the moving image that was moved by a drag operation which changes the position of the touch operation via the operation part is calculated by reflecting the amount of movement of the moving image based on the amount of movement by the drag operation on the coordinates of the four corners of the second moving image display view, and the moving image is displayed at the post-movement position.

Preferably, the position before magnification or reduction of the moving image selected via the operation part is obtained on the basis of the coordinates of the four corners of the second moving image display view, the position after magnification or reduction of the moving image that was magnified or reduced via the operation part is calculated by reflecting the magnification/reduction rate of the moving image on the coordinates of the four corners of the second moving image display view, and the moving image is displayed at the position after magnification or reduction.

Preferably, the operation part is a touch-sensitive surface, and the position before magnification or reduction of the moving image selected by a touch operation at two or more points via the operation part is obtained on the basis of the coordinates of the four corners of the second moving image display view, the position after magnification or reduction of the moving image that was magnified or reduced by a pinch operation which changes the position of at least one point of the touch operation via the operation part is calculated by reflecting the magnification/reduction rate of the moving image based on the amount of movement by the pinch operation on the coordinates of the four corners of the second moving image display view, and the moving image is displayed at the position after magnification or reduction.

Preferably, two or more of the second moving image display views are generated, a moving image is played back on each of the second moving image display views, and if the moving images which have been moved via the operation part are overlapped on each other, the moving image which has been selected via the operation part is displayed at the topmost position.

In addition, the present invention is a moving image playback device including an operation part that performs an operation related to playback of a moving image; a control part that controls a request from the operation part; and a display part that displays the moving image according to the control of the control part, wherein the control part generates a first moving image display view which is a movable region of a moving image to be projected in the display part; generates a second moving image display view which enables the moving image to be moved on the first moving image display view; plays back the moving image on the second moving image display view; obtains, on the basis of the coordinates of the four corners of the second moving image display view, a pre-movement position of the moving image selected via the operation part; calculates a post-movement position of the moving image that was moved via the operation part by reflecting the amount of movement of the moving image on the coordinates of the four corners of the second moving image display view; and displays the moving image at the post-movement position.

Preferably, the operation part is a touch-sensitive surface, and the control part obtains, on the basis of the coordinates of the four corners of the second moving image display view, the pre-movement position of the moving image selected by a touch operation at one or more points via the operation part; calculates the post-movement position of the moving image that was moved by a drag operation which changes the position of the touch operation via the operation part by reflecting the amount of movement of the moving image based on the amount of movement by the drag operation on the coordinates of the four corners of the second moving image display view; and displays the moving image at the post-movement position.

Preferably, the control part obtains, on the basis of the coordinates of the four corners of the second moving image display view, the position before magnification or reduction of the moving image selected via the operation part; calculates the position after magnification or reduction of the moving image that was magnified or reduced via the operation part by reflecting the magnification/reduction rate of the moving image on the coordinates of the four corners of the second moving image display view; and displays the moving image at the position after magnification or reduction.

Preferably, the operation part is a touch-sensitive surface, and the control part obtains, on the basis of the coordinates of the four corners of the second moving image display view, the position before magnification or reduction of the moving image selected by a touch operation at two or more points via the operation part; calculates the position after magnification or reduction of the moving image that was magnified or reduced by a pinch operation which changes the position of at least one point of the touch operation via the operation part by reflecting the magnification/reduction rate of the moving image based on the amount of movement by the pinch operation on the coordinates of the four corners of the second moving image display view; and displays the moving image at the position after magnification or reduction.

Preferably, two or more of the second moving image display views are generated, a moving image is played back on each of the second moving image display views, and if the moving images which have been moved via the operation part are overlapped on each other, the moving image which has been selected via the operation part is displayed at the topmost position.

Further, the present invention is a computer readable storage medium which stores a moving image playback program for causing a computer to execute the following: a procedure for generating a first moving image display view which is a movable region of a moving image to be projected in a display part; a procedure for generating a second moving image display view which enables the moving image to be moved on the first moving image display view; a procedure for playing back the moving image on the second moving image display view; a procedure for obtaining, on the basis of the coordinates of the four corners of the second moving image display view, a pre-movement position of the moving image selected via an operation part; and a procedure for calculating a post-movement position of the moving image that was moved via the operation part by reflecting the amount of movement of the moving image on the coordinates of the four corners of the second moving image display view, and displaying the moving image at the post-movement position.

Preferably, the operation part is a touch-sensitive surface, and the present invention is computer readable storage medium which stores a moving image playback program for causing a computer to execute the following: a procedure for obtaining, on the basis of the coordinates of the four corners of the second moving image display view, the pre-movement position of the moving image selected by a touch operation at one or more points via the operation part; and a procedure for calculating the post-movement position of the moving image that was moved by a drag operation which changes the position of the touch operation via the operation part by reflecting the amount of movement of the moving image based on the amount of movement by the drag operation on the coordinates of the four corners of the second moving image display view, and displaying the moving image at the post-movement position.

Preferably, the present invention is computer readable storage medium which stores a moving image playback program for causing a computer to execute the following: a procedure for obtaining, on the basis of the coordinates of the four corners of the second moving image display view, the position before magnification or reduction of the moving image selected via the operation part; and a procedure for calculating the position after magnification or reduction of the moving image that was magnified or reduced via the operation part by reflecting the magnification/reduction rate of the moving image on the coordinates of the four corners of the second moving image display view, and displaying the moving image at the position after magnification or reduction.

Preferably, the operation part is a touch-sensitive surface, and the present invention is computer readable storage medium which stores a moving image playback program for causing a computer to execute the following: a procedure for obtaining, on the basis of the coordinates of the four corners of the second moving image display view, the position before magnification or reduction of the moving image selected by a touch operation at two or more points via the operation part; and a procedure for calculating the position after magnification or reduction of the moving image that was magnified or reduced by a pinch operation which changes the position of at least one point of the touch operation via the operation part by reflecting the magnification/reduction rate of the moving image based on the amount of movement by the pinch operation on the coordinates of the four corners of the second moving image display view, and displaying the moving image at the position after magnification or reduction.

Preferably, the present invention is computer readable storage medium which stores a moving image playback program for causing a computer to execute the following: a procedure for generating two or more of the second moving image display views; a procedure for playing back a moving image on each of the second moving image display views; and if the moving images which have been moved via the operation part are overlapped on each other, a procedure for displaying the moving image which has been selected via the operation part at the topmost position.

A "computer" includes smart devices, and corresponds to, for example, a prescribed personal computer, cellular telephone, smartphone, or tablet PC, and may include all devices capable of exchanging prescribed information with another computer or server via a network. The "computer" may be loaded with, for example, an interactive device represented by smartphones, tablets, or smart televisions as well as an application development program.

A "display part" corresponds to, for example, a display or screen on which prescribed information which is arithmetically processed by the computer is projected, and may be a part of the computer or connectable to the computer via a prescribed cable or network.

An "operation part" corresponds to, for example, a keyboard that inputs a request for a prescribed arithmetic processing to the computer, or a touch-sensitive surface such as a touch pad or a touch panel that is integral with the display part, and may be a part of the computer or connectable to the computer via a prescribed cable or network.

A "first moving image display view" and a "second moving image display view" may be moving image display regions which are generated in a moving image playback frame of a prescribed application for moving image playback. The "second moving image display view" may be generated within a moving image display region of the "first moving image display view" and in a superordinate layer of the "first moving image display view". There may be one "first moving image display view", and one or two or more "second moving image display views". The two or more "second moving image display views" may be generated upon being divided into layers. The two or more "second moving image display views" which have been generated upon being divided into layers may be overlapped above and below each other. The shape of each "second moving image display view" may be rectangular or circular.

A "moving image" may be viewable by streaming distribution from a prescribed server (for example, a program related to news or sports or a video contributed by a general user, etc.), or viewable by downloading electronic data including an extension (avi, mov, 3GP, MP4, etc.) exclusive for moving images, or captured by a camera function of the computer. The moving image displayed in the "second moving image display view" may be movable through the moving image display region of the "first moving image display view". The position of the "moving image" may be calculated in consideration of the horizontal and vertical dimensions of the "second moving image display view" on the basis of the coordinates of one of the four corners of the rectangular "second moving image display view".

Effects of Invention

According to the moving image playback method of the present invention, by generating the second moving image display view on the first moving image display view, it is possible to slide the moving image in the horizontal and vertical directions within the display part. In other words, the first moving image display view, which corresponds to a moving image display frame used in a general moving image playback method, is a pseudo moving image display view in the present invention, and the moving image is actually played back on the second moving image display view. Thereby, the second moving image display view can be moved within the range of the first moving image display view, and in accordance with this movement, the display position of the moving image in playback on the second moving image display view can be changed. At this time, the coordinates of the four corners of the second moving image display view before and after movement can be easily obtained, and thus the moving image can be immediately played back at the display position after movement.

DESCRIPTION OF EMBODIMENTS

Below, the features of a moving image playback device according to the present invention will be explained referring to FIGS. 1 to 12.

First, the hardware configuration of a moving image playback device 1 will be explained using FIG. 1.

Figure 1:
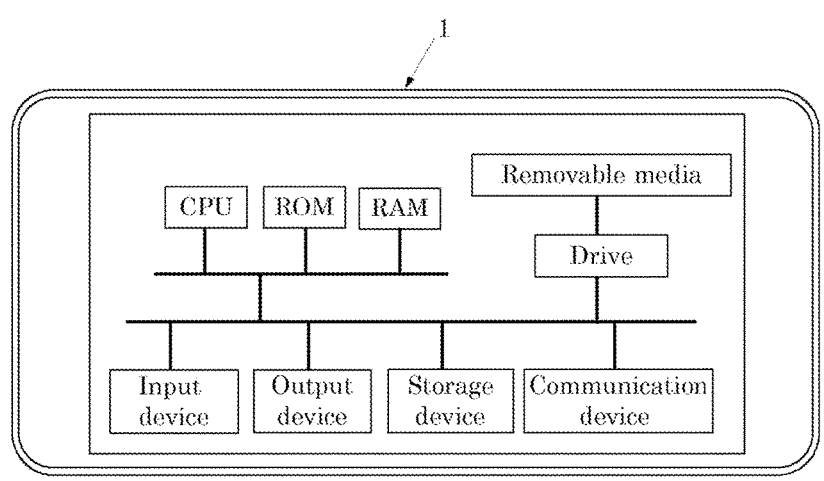
FIG. 1 is a block diagram of the hardware configuration of a moving image playback device.

The moving image playback device 1 shown in FIG. 1 may be a general smart device, and may be loaded with, for example, a CPU (Central Processing Unit) that arithmetically processes a prescribed operation (for example, execution of an OS (Operating System) or application) related to the smart device, a ROM (Read Only Memory) that stores various programs and various data (such as moving images) related to the prescribed operation, and a RAM (Random Access Memory) that loads the various programs and various data. The CPU, ROM, and RAM may be connected to each other via a bus. An input/output interface may be connected to the bus. The following may be connected to the input/output interface: an input device (for example, a keyboard, a mouse, a touch panel, a voice recognition application, or a device loaded with such an application); an output device (for example, a screen or sound output speaker); a storage device (for example, a hard disk drive or flash memory); and a communication device. A drive may be connected to the input/output interface, and a removable media (for example, a magnetic disk, an optical disk, a magneto-optical disk, or a semiconductor memory) may be appropriately mounted so that writing and reading of prescribed information can be performed.

The moving image playback device 1 and another computer may be constituted as a system via a prescribed communication network. The communication network may be, for example, internet, intranet, extranet, LAN, CATV communication network, VPN, telephone line, mobile communication network, and satellite communication network. A transmission medium which constitutes all or a portion of the communication network may be utilized in a wired manner (for example, IEEE1394, USB, power line carrier, or telephone wire) or a wireless manner (for example, IrDA, Bluetooth (registered trademark), 802.11 wireless, mobile telephone network, satellite circuit, or terrestrial digital network). Uploads and downloads of data and programs may be conducted via the communication device between the computers, and data and programs may be transferred via a removable media between the computers.

The moving image playback device 1 may be started up using a prescribed OS, and internet pages may be viewed thereon via a browser. The moving image playback device 1 may be provided with, for example, a power button that turns a power source on/off, a volume adjustment button that adjusts the sound volume, and a home button that displays a standby screen on the touch panel. These buttons may be electronically displayed on the touch panel. In the moving image playback device 1, a prescribed application program may be downloaded via the communication network and then installed so that it can be executed. During execution, the application program may be displayed on the touch panel and operated via the touch panel.

Next, the relationship between each function of the moving image playback device 1 and the hardware will be explained using FIG. 2.

Figure 2:
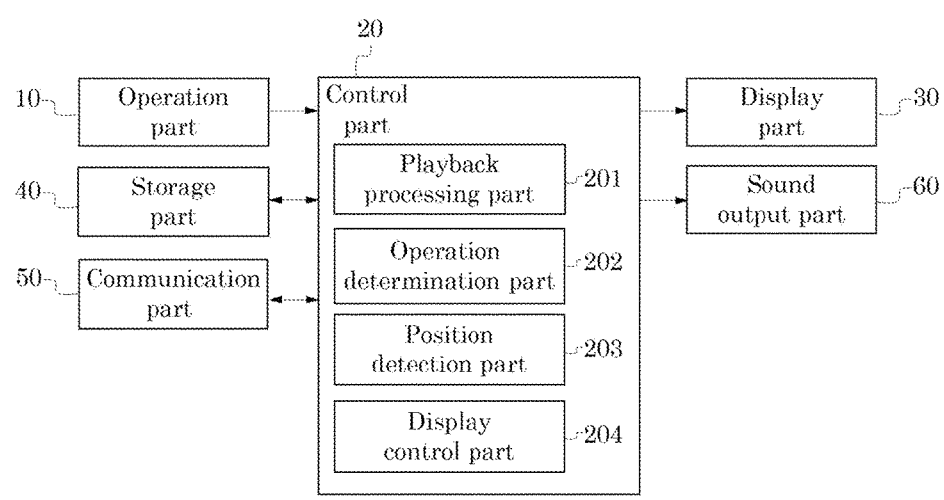
FIG. 2 is a functional block diagram of the moving image playback device.

As shown in FIG. 2, the moving image playback device 1 may be provided with the following: an operation part 10 that performs an operation related to playback of a moving image; a control part 20 that controls (including arithmetic processing) a request related to the operation from the operation part; a display part 30 that displays the moving image according to the control of the control part; a storage part 40 that stores a program related to an application for moving image playback and information of the moving image; a communication part 50 that exchanges information related to the moving image with another computer via a communication network; and a sound output part 60 that outputs sound of the moving image.

The operation part 10 may perform all operations related to the moving image playback device 1. The control part 20 may control a request from another part including the storage part 40 or the communication part 50. The display part 30 may display other information including characters or static images related to the moving image playback device 1. The storage part 40 may store other programs and other information including characters or static images related to the moving image playback device 1. The communication part 50 may exchange other programs and other information including characters or static images related to the moving image playback device 1. The sound output part 60 may output other sounds related to the moving image playback device 1.

The operation part 10 may be a touch panel in which a keyboard or button is displayed on the display part 30 The keyboard or button functioning as the operation part 10 may be displayed in the display part 30 in accordance with the startup of an application for moving image playback. The operations that are executed on the operation part 10 may include a touch operation in which there are one or more positions in contact with the operation part, a drag operation in which all of the positions of the touch operation are changed by sliding, a pinch operation in which at least one position of the touch operation with two or more positions is changed by sliding, a tap operation in which a prescribed location is tapped, and a long-press operation in which a prescribed location is continuously touched.

An "operation related to playback of a moving image" by the operation part 10 may include, for example, an operation for starting up an application for moving image playback, an operation for selecting a moving image to playback, an operation for playing back, stopping, or switching a moving image, an operation for changing the display position of a moving image, an operation for changing the display size of a moving image, and an operation for switching the sound or adjusting the volume of a moving image.

The control part 20 may be a CPU which arithmetically processes a prescribed operation related to the moving image playback device 1, or a program loaded in such a CPU. The control part 20 may include the following: a playback processing part 201 that plays back or stops a moving image according to a request of the operation part 10; an operation determination part 202 that determines the content of an operation from the operation part; a position detection part 203 that detects the coordinate position before/after movement or magnification/reduction of a moving image by an operation of the operation part; and a display control part 204 that performs control to display a moving image in the display part 30 according to an operation of the operation part.

The control part 20 may start up an application for moving image playback according to a request of the operation part 10.

The playback processing part 201 may generate the first moving image display view in a moving image playback frame when the application for moving image playback has been started up by the operation part 10, and may generate the second moving image display view within a moving image display region of the first moving image display view and in a superordinate layer of the first moving image display view when a moving image to be played back has been selected by the operation part. Further, if two or more moving images to be played back have been selected by the operation part 10, the playback processing part 201 may generate each second moving image display views in a separate layer.

The operation determination part 202 may determine the difference between a touch operation, a drag operation, a pinch operation, a tap operation, or a long-press operation by the operation part 10, or the difference of an object on which these operations are performed (for example, a keyboard, button, or moving image displayed on the display part 30. If two or more moving images are being displayed on the display part 30, the operation determination part 202 may determine that the moving image on which a tap operation was performed is the object on which a subsequent operation is performed.

The position detection part 203 may define or detect the position of the second moving image display view associated with a moving image before/after a movement operation or a magnification/reduction operation or a drag operation or a pinch operation performed on the moving image by the operation part 10. A "movement operation" may include, for example, an operation in which a prescribed button is pressed down to slide an object to be moved. A "magnification/reduction operation" may include, for example, an operation in which a prescribed button is pressed down to magnify or reduce an object to be magnified/reduced.

The "position of the second moving image display view" may be calculated based on the coordinates of one of the four corners of the rectangular-shaped second moving image display view.

For example, if the coordinates of one corner of the second moving image display view are (x, y) and the horizontal dimension and vertical dimension of the second moving image display view are "a" and "b", the coordinate position of the second moving image display view before a movement operation or a magnification/reduction operation or a drag operation or a pinch operation may be defined as (x, y), (x+a, y), (x, y+b), (x+a, y+b).

On the basis of the above coordinate position, if the moving image is slid by a movement operation or a drag operation by "c" in the horizontal direction and "d" in the vertical direction, the coordinate position of the second moving image display view after the movement operation or drag operation may be detected as (x+c, y+d), (x+a+c, y+d), (x+a, y+b+d), (x+a+c, y+b+d).

If the moving image is magnified or reduced by a magnification/reduction operation or a pinch operation by the same magnification/reduction rate in the horizontal direction and the vertical direction at the coordinate position defined above, the coordinate position of the second moving image display view after the magnification/reduction operation or pinch operation may be detected based on the magnification/reduction rate. If the moving image is magnified or reduced by a pinch operation, the magnification/reduction rate may be calculated from the amount of movement (movement distance) of the portion which is touched in the pinch operation.

The display control part 204 may perform control to display, in the display part 30, the moving image which has been changed with regard to the position, size, display order, or sound according to an operation from the operation part 10 determined by the operation determination part 202. In other words, the display control part 204 may control and display the moving image which has changed in association with the position or size of the second moving image display view as defined or detected by the position detection part 203. The "display order" may indicate a priority for displaying, in the display part 30, the moving images being played back in the two or more moving image display views. For example, if the moving images are overlapped on each other by a movement operation or magnification/reduction operation or drag operation or pinch operation from the operation part 10, the moving image which has been selected by a tap operation on a button for moving image switching which functions as the operation part 10 displayed in the display part 30 or on a moving image in playback may be displayed at the topmost position.

The display part 30 may be a touch panel in which the operation part 10 that inputs a request to the moving image playback device 1 and a screen which outputs an operation result in response to the request are integrated. The storage part 40 may be a ROM or RAM that stores an application for moving image playback, the operation of which is controlled by the control part 20, as well as moving images. The communication part 50 may be a data communication device that enables moving images stored on a prescribed server via a communication network to be viewed over streaming distribution from a URL (Uniform Resource Locator), and that downloads such moving images to enable them to be stored. The sound output part 60 may be a speaker that outputs sound of a moving image that is played back by control of the control part 20.

Next, referring to FIGS. 1 to 11, the states and flow when the moving image playback device starts up the application for moving image playback and plays back a moving image will be explained.

FIGS. 5, 7, 9, and 11 are for schematically explaining the hierarchical relationship among the application for moving image playback executed by a prescribed program, the first moving image display view, the second moving image display view, and the moving images. Therein, the dimensions and shapes of the depicted parts and the distances between them, etc. are not limited.

First, using FIG. 3, an example of a state in which a plurality of moving images are simultaneously played back in the application for moving image playback will be explained.

Figure 3:
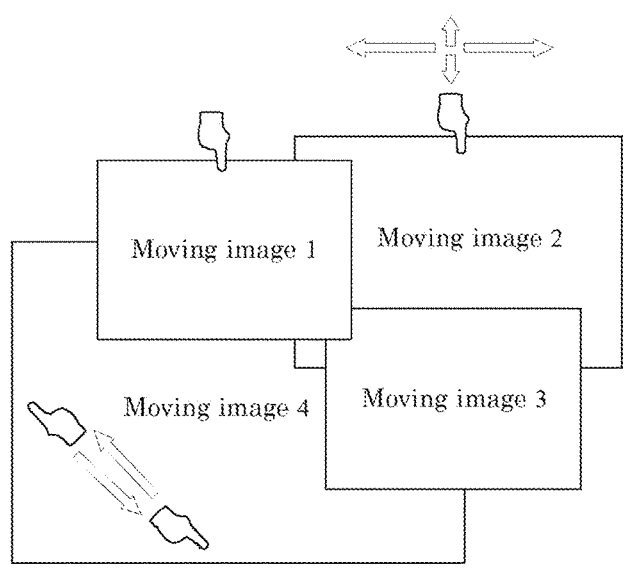
FIG. 3 is a functional schematic view of an application for moving image playback.

As shown in FIG. 3, when the application for moving image playback is started up and four moving images to be played back are selected, all of the moving images may be displayed on the screen. Each of the four moving images which are displayed may be slid in the vertical/horizontal direction by a drag operation, or the display size thereof may be magnified/reduced by a pinch operation. The moving images which have been slid or magnified/reduced may be displayed overlapping in front of or behind each other, and a desired moving image may be displayed on the forward-most surface by a tap operation on the desired moving image.

The position and size in which the selected moving image is first displayed are not limited thereto, and the position and size of display may be changed according to the number of moving images. For example, the moving image which was selected first may be displayed largely in the center of the screen. This first moving image may be automatically shifted horizontally and reduced in size at the same time that a second moving image is selected, and the second moving image may be displayed side-by-side with the first moving image and in the same size as the first moving image.

Next, using FIGS. 2, 4, and 5, the flow of displaying the moving images in the application for moving image playback and an overview of the functions therein will be explained.

Figure 4:
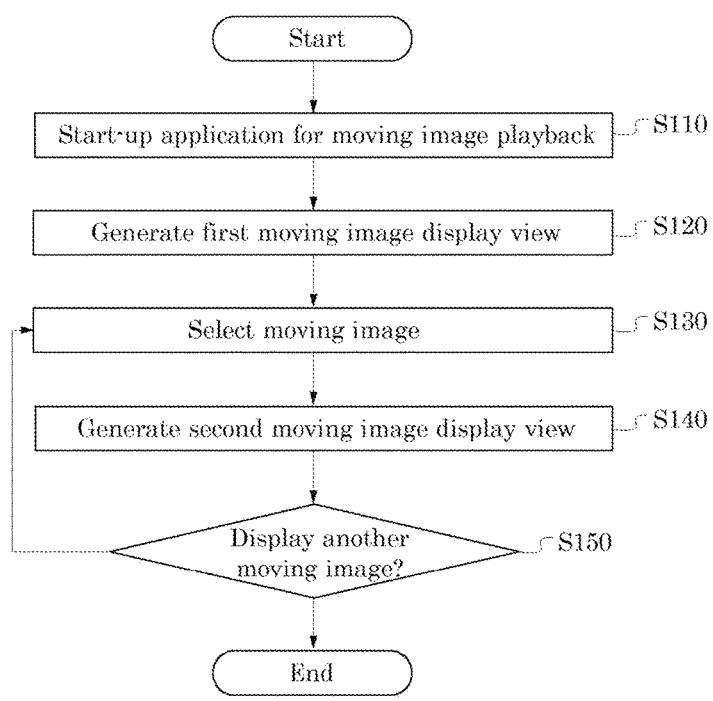
FIG. 4 is a flow diagram of a moving image playback process.
Figure 5:
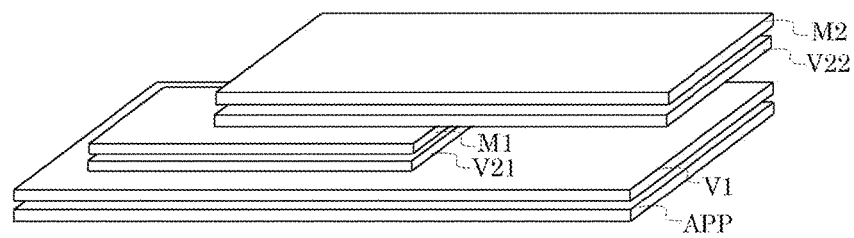
FIG. 5 is a functional schematic view of the moving image playback process.

As shown in FIGS. 2, 4, and 5, on the basis of a request of the operation part 10, the control part 20 may call the application program for moving image playback from the storage part 40, and start up an application APP for moving image playback (step S110). At this time, a first moving image display view V1 for playback of a moving image may be generated in accordance with the startup of the application APP for moving image playback (step S120). Next, on the basis of a request of the operation part 10, a moving image M1 for streaming distribution via the communication part 50 is selected (S130). At this time, in accordance with the selection of the moving image M1, a second moving image display view V21 for playback of this moving image may be generated in a superordinate layer of the first moving image display view V1 (S140). Further, in accordance with a determination of whether or not any other moving images will be displayed (S150), the previous steps (S130 and S140) may be repeated. At this time, another second moving image display view V22 for playback of another moving image M2 may be generated in a superordinate layer of the second moving image display view V21.

The size of the first moving image display view V1 may be the same as or smaller than the size of the moving image playback frame in the application APP for moving image playback. The sizes of the second moving image display views V21 and V22 may be the same as or smaller than the size of the first moving image display view V1.

Herein, an example of the application program for moving image playback indicating the relationship between the first moving image display view V1 and the second moving image display views V21 and V22 is shown below.

```
public void run( ) {
    final ViewGroup dammyView = mViewGroupmap.get(tag);
    final SurfaceView playerView = mCustomVideoViewmap.get(tag);
```

```
    mHandler.post(new Runnable( ) {
        public void run( ) {
            dammyView.addView(playerView);
        }
    });
}
```

At this time, dammyView written in the second line may be the first moving image display view V1, "playerView" written in the third line may be the moving image playback frame of the application APP for moving image playback, and "dammyView" written in the sixth line may be the second moving image display views V21 and V22. Further, "addView(playerView)" written in the sixth line may cause the second moving image displays views V21 and V22 to function as moving image playback frames. In this way, a generation program of the second moving image display views V21 and V22 may be included in the generation program of the first moving image display view V1, and thereby the second moving image display views may be generated in a superordinate layer of the first moving image display view. The two or more second moving image display views which have been generated may be layered from the bottom to the top in the order in which they were generated, and this order (moving image display position) may be switched in accordance with a prescribed operation (for example, a tap operation).

As one example of an OS for a smart device, a class (MediaPlayer) which mounts a moving image playback function on the OS may be prepared. In the application for moving image playback using the MediaPlayer class, display object information may be described for each operation object such as a button or seek bar, etc. by which a function (method) related to moving image playback is executed. Further, in the above-described example of the application program for moving image playback, "SurfaceView" written in the third line may be "TextureView", and thereby an improvement in the programming efficiency by a developer and the performance in moving image playback may be realized.

Next, using to FIGS. 2, 6, and 7, the flow of a slide process of a moving image displayed in the application for moving image playback and an overview of the functions therein will be explained.

Figure 6:
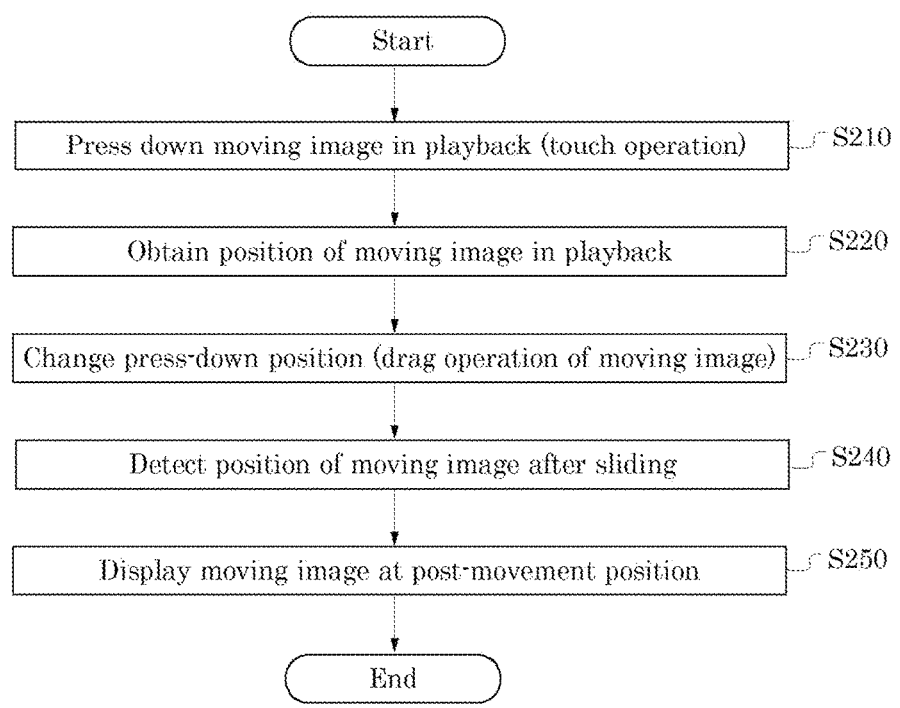
FIG. 6 is a flow diagram of a moving image slide process.
Figure 7:
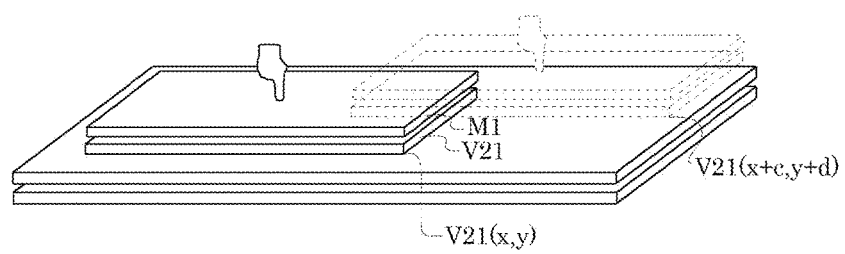
FIG. 7 is a functional schematic view of the moving image slide process.

As shown in FIGS. 2, 6, and 7, the operation determination part 202 may determine a touch operation by the operation part 10 in which the moving image M1 in playback is pressed down (S210). At this time, the position detection part 203 may obtain the position of the second moving image display view V21 in which the moving image M1 is being displayed (S220). As a method for obtaining the coordinate position of the second moving image view, for example, if the coordinates of one of the four corners of the second moving image display view V21 are (x, y) and the horizontal dimension and vertical dimension of the second moving image display view are "a" and "b", the coordinate position of the second moving image display view before a slide process may be defined as (x, y), (x+a, y), (x, y+b), (x+a, y+b). Subsequently, the operation determination part 202 may determine a drag operation by the operation part 10 as a change in the press down position (S230). At this time, the position detection part 203 may obtain the position of the second moving image display view V21 as the position of the moving image M1 after sliding (S240). For example, if the moving image M1 is slid by "c" in the horizontal direction and "d" in the vertical direction, the coordinate position of the second moving image display view V21 after sliding may be detected as (x+c, y+d), (x+a+c, y+d), (x+a, y+b+d), (x+a+c, y+b+d). Subsequently, the display control part 204 may display the moving image M1 at the coordinate position of the second moving image display view V21 after sliding (S250).

Next, using FIGS. 2, 8, and 9, the flow of a magnification/reduction process of a moving image displayed in the application for moving image playback and an overview of the functions therein will be explained.

Figure 8:
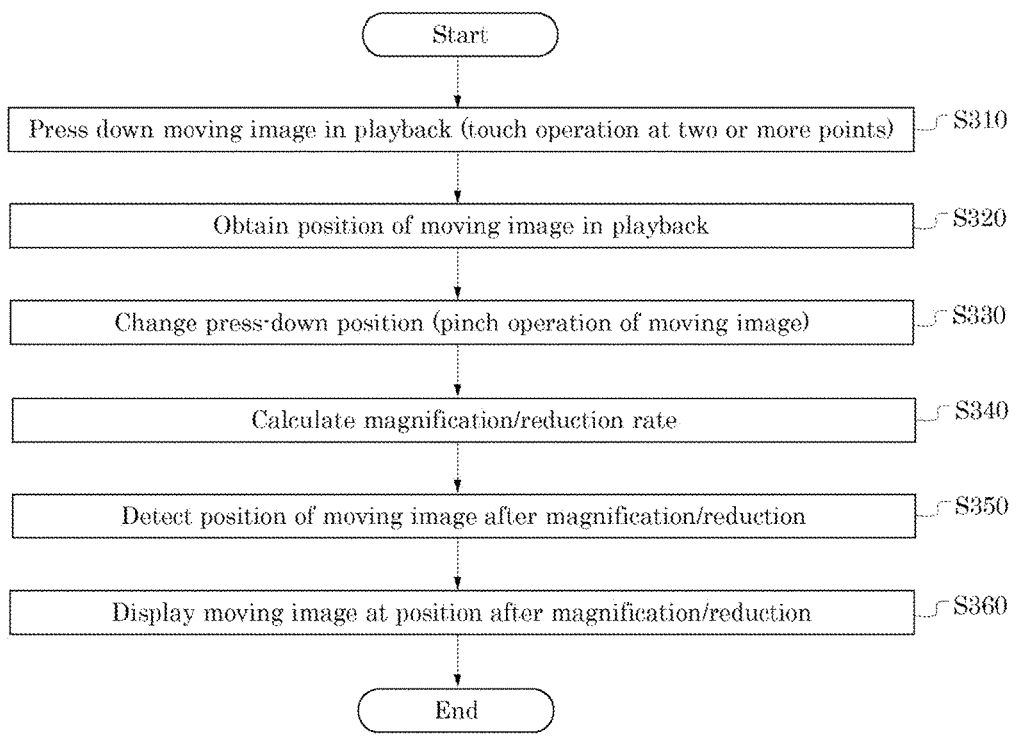
FIG. 8 is a flow diagram of a moving image magnification/reduction process.
Figure 9:
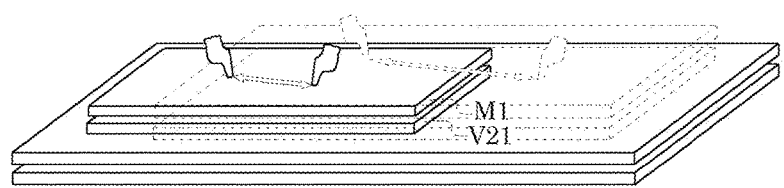
FIG. 9 is a functional schematic view of the moving image magnification/reduction process.

As shown in FIGS. 2, 8, and 9, the operation determination part 202 may determine a touch operation at two or more points by the operation part 10 in which the moving image M1 in playback is pressed down (S310). At this time, the position detection part 203 may obtain the position of the second moving image display view V21 in which the moving image M1 is being displayed (as the method for obtaining the coordinate position of the second moving image display view, a method equivalent to the method for obtaining described above may be used) (S320). Subsequently, the operation determination part 202 may determine a pinch operation by the operation part 10 as a change in the press down position (S330). At this time, the position detection part 203 may obtain the amount of movement of the press down position before and after the pinch operation, and may calculate the magnification/reduction rate of the moving image M1 and the second moving image display view V21 from the amount of movement (S340). The coordinate position of the second moving image display view after the pinch operation may be detected based on the calculated magnification/reduction rate (S350). Subsequently, the display control part 204 may display the moving image M1 at the coordinate position of the second moving image display view after sliding (S360).

Next, using FIGS. 2, 10, and 11, the flow of a display order changing process of a moving image displayed in the application for moving image playback and an overview of the functions therein will be explained.

Figure 10:
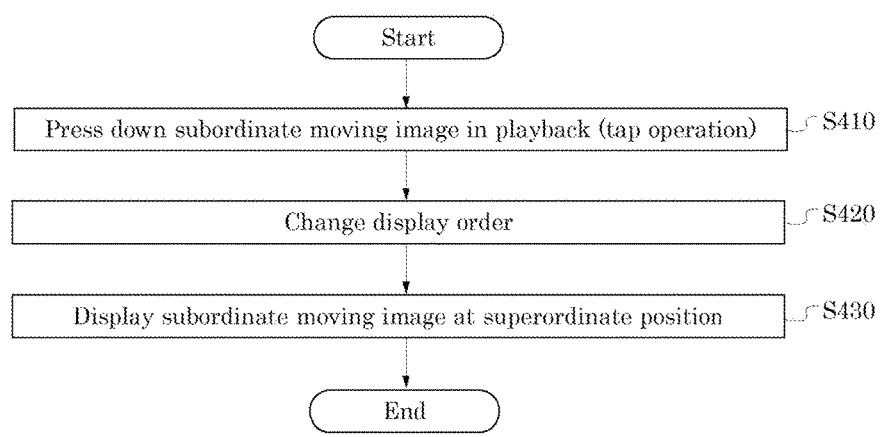
FIG. 10 is a flow diagram of a moving image display order changing process.
Figure 11:
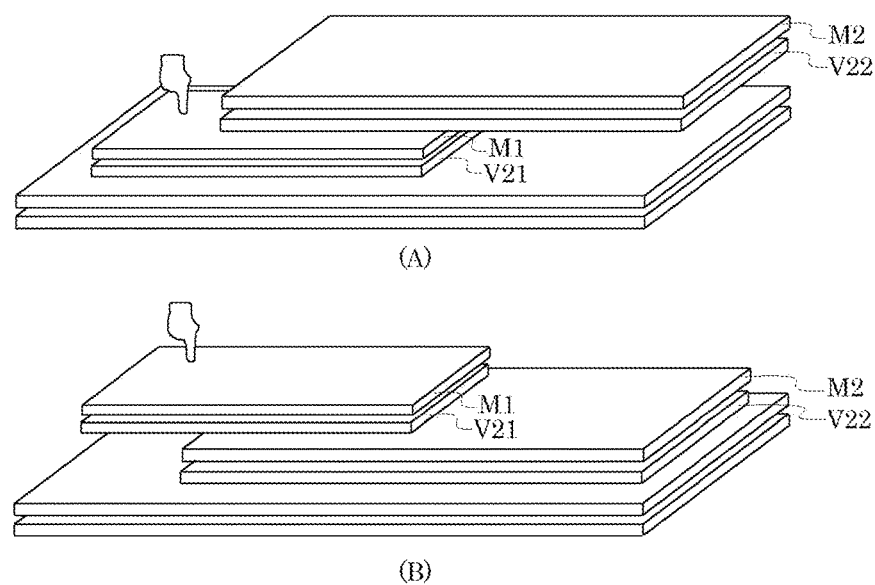
FIG. 11 is a functional schematic view of the moving image display order changing process.

As shown in FIGS. 2, 10, and 11, if two or more moving images are being played back, the operation determination part 202 may determine a tap operation by the operation part 10 in which a subordinate moving image in playback is pressed down (S410). At this time, the display control part 204 may change the display order of the moving image subjected to the tap operation (S420). For example, as shown in FIG. 11(A), if the moving image M1 is selected first and the moving image M2 is selected next, setting may be performed such that the second moving image display view V21 and the moving image M1 are displayed on the bottom and the second moving image display view V22 and the moving image M2 are displayed on the top. Further, on the basis of the operation determination part 202 which has determined a tap operation on the moving image M1, the setting may be changed so that the second moving image display view V21 and the moving image M1 are displayed in the superordinate layer. Subsequently, as shown in FIG. 11(B), the display control part 204 may display the second moving image display view V21 and the moving image M1 in the topmost position (S430).

Figure 12:
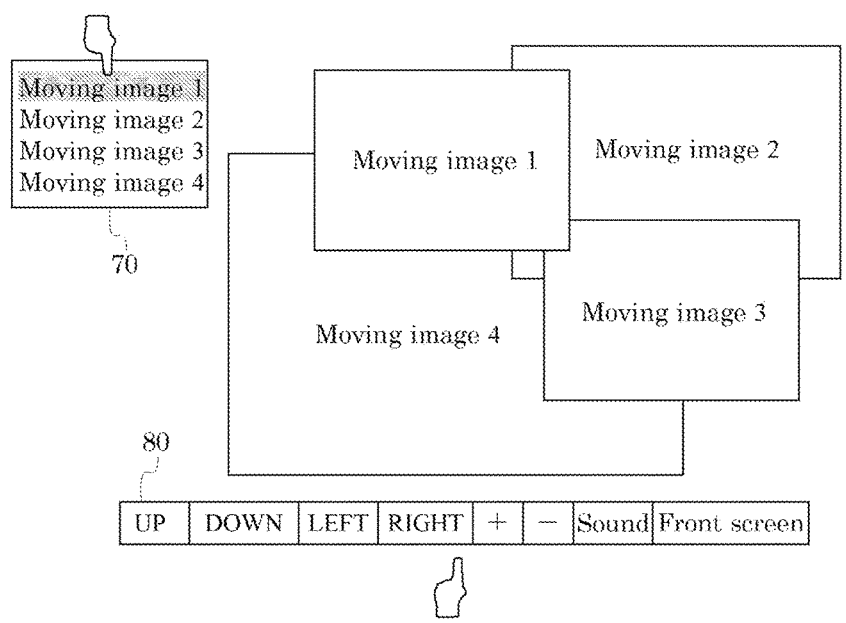
FIG. 12 is a functional schematic view of another application for moving image playback.

Next, using FIGS. 2 and 12, an overview of the functions of another slide process, magnification/reduction process, and display order changing process of a moving image displayed in the application for moving image playback will be explained.

The application for moving image playback may have a function to display, in the display part 30, a moving image display switching button 70 and a moving image operation button 80 which function as the operation part 10. The moving image display switching button 70 may change the display order of moving images 1 to 4 in playback. For example, upon recognition of a tap operation on "moving image 1" displayed in the moving image display switching button 70, the moving image 1 in playback may be displayed at the topmost position. Further, the sound accompanying the moving image 1 may be emitted from the sound output part 60. The moving image operation button 80 may change the position, size, or sound of the moving images 1 to 4 in playback. For example, upon recognition of a tap operation on "UP", "DOWN", "LEFT, or "RIGHT" displayed in the moving image operation button 80, one or all of the moving image 1 to 4 may be subjected to a slide process in the up, down, left, or right directions. Upon recognition of a tap operation on "+ (plus)" or "− (minus)" displayed in the moving image operation button 80, one or all of the moving images 1 to 4 may be subjected to a magnification/reduction process. Upon recognition of a tap operation on "sound", a switching process to the sound emitted by the moving image in playback may be performed. Upon recognition of a tap operation on "front screen", a process for changing the display order of the moving images 1 to 4 to a predetermined order from the topmost position may be performed. The moving image display order switching button 70 may be displayed upon recognition of a tap operation on "sound" or "front screen" of the moving image operation button 80.

In this way, the moving image playback device 1 according to one embodiment of the present invention generates the second moving image display view V21 on the first moving image display view V1, and thereby the moving image M1 can be slid in the horizontal and vertical directions within the display part 30. In other words, the first moving image display view V1, which corresponds to a moving image display frame used in a general moving image playback method, is a pseudo moving image display view in this embodiment of the present invention, and the moving image is actually played back on the second moving image display view V21. Thereby, the second moving image display view V21 can be moved within the range of the first moving image display view V1, and in accordance with this movement, the display position of the moving image in playback on the second moving image display view can be changed. At this time, the coordinates of the four corners of the second moving image display view V21 before and after movement can be easily obtained, and thus the moving image M1 can be immediately played back at the display position after movement.

By enabling the playback and sound switching of a plurality of moving images and the movement and magnification/reduction of the contents thereof in a single smart device application, for example, a broadcast station can easily confirm the broadcast content of other stations, and this is effective in consideration of program organization. For example, when fast-breaking news has occurred, if the broadcast content of other stations could be ascertained in real time, it would be possible to deliver a broadcast from a different perspective, and this may lead to increased viewer ratings and profits. Further, since the communication capacity increases according to the number of moving images played back simultaneously, this also leads to an increase in communication charges for the provider.

In addition, for the users/viewers, in the event of an earthquake, for example, when a user/viewer wishes to confirm the news urgently, he/she can view the content of multiple broadcast stations in real time, and if he/she can adjust the sound, screen position, and size of a specific program, he/she can quickly ascertain the range of influence of the earthquake which affects him/her.

With regard to live broadcasts of sports or concerts with overlapping time slots, for example, events occurring in multiple places can be simultaneously viewed and compared with a single smart device and viewed by multiple people using an external display.

Capturing a specific sports athlete from different angles with multiple cameras and simultaneously playing back the saved screens on a single device serves as an effective means for analyzing the form of the athlete and for scouting.

Since video images from multiple surveillance cameras can be confirmed on a single device, the police, army, and security firms can simultaneously monitor multiple targets of surveillance on a single device, and this is an effective means for performing their activities.

By connecting the moving image playback device 1 to an external display, etc. using wires or wirelessly, a screen shown in the display part 30 can be projected, and further, such a screen can be projected according to a specific operation (simultaneous playback of multiple moving images, sound switching, front-screen movement of a moving image, horizontal movement of a moving image, magnification/reduction of a moving image) on the moving image playback device. Thereby, the smart device can be used as a remote controller, and thus the moving image playback device can be used on a large screen by a large number of people.

INDUSTRIAL APPLICABILITY

The present invention can be used in a wide variety of industries related not only to broadcasts and communications, but also sports, munitions, education, security, and the like.

EXPLANATION OF REFERENCE NUMERALS

1 moving image playback device
10 operation part
20 control part
30 display part
APP application for moving image playback
V1 first moving image display view
V21 second moving image display view
M1 moving image

The invention claimed is:

1. A moving image playback method to be executed by a computer, the method comprising:
    generating a first moving image display view on a display part by an application for moving image playback, wherein the first moving image display view is a pseudo moving image display frame that is unable to play back moving images;
    generating two or more second moving image display views only on the first moving image display view by the application, wherein the second moving image display views are repositionable only within the pseudo moving image display frame;
    playing back the moving images on the second moving image display views;
    obtaining, on the basis of coordinates of the four corners of one of the second moving image display views, a pre-reposition position of one of the moving images selected via an operation part;
    calculating a post-reposition position of the one of the moving images that has been repositioned via the operation part by reflecting an amount of reposition of the one of the moving images on the coordinates of the four corners of the one of the second moving image display views; and
    displaying the moving images at the post-reposition position,
    wherein if the moving images overlap each other, the one of the moving images which has been selected via the operation part is displayed at a topmost position.

2. The moving image playback method according to claim 1, wherein the operation part is a touch-sensitive surface,
    the pre-reposition position of the one of the moving images selected by a touch operation at one or more points via the operation part is obtained on the basis of the coordinates of the four corners of the one of the second moving image display views,
    the post-reposition position of the one of the moving images that has been repositioned by a drag operation which changes a position of the touch operation via the operation part is calculated by reflecting the amount of reposition of the one of the moving images based on an amount of reposition by the drag operation on the coordinates of the four corners of the one of the second moving image display views, and
    the one of the moving images is displayed at the post-reposition position.

3. The moving image playback method according to claim 1, further comprising:
    obtaining a position before magnification or reduction of the one of the moving images selected via the operation part on the basis of the coordinates of the four corners of the one of the second moving image display views,
    calculating a position after magnification or reduction of the one of the moving images that has been magnified or reduced via the operation part by reflecting a magnification/reduction rate of the one of the moving images on the coordinates of the four corners of the one of the second moving image display views, and
    displaying the one of the moving images at the position after magnification or reduction.

4. The moving image playback method according to claim 3, wherein the operation part is a touch-sensitive surface,
    the position before magnification or reduction of the one of the moving images selected by a touch operation at two or more points via the operation part is obtained on the basis of the coordinates of the four corners of the one of the second moving image display views,
    the position after magnification or reduction of the one of the moving images that has been magnified or reduced by a pinch operation which changes a position of at least one point of the touch operation via the operation part is calculated by reflecting the magnification/reduction rate of the one of the moving images based on an amount of reposition by the pinch operation on the coordinates of the four corners of the one of the second moving image display views, and
    the one of the moving images is displayed at the position after magnification or reduction.

5. A moving image playback device, comprising:
    an operation part that performs an operation related to playback of moving images;
    a control part that controls a request from the operation part; and
    a display part that displays the moving images according to the control of the control part, wherein the control part:
generates a first moving image display view on the display part by an application for moving image playback, wherein the first moving image display view is a pseudo moving image display frame that is unable to play back moving images;
generates two or more second moving image display views only on the first moving image display view by the application, wherein the second moving image display views are repositionable only within the pseudo moving image display frame;
plays back the moving images on the second moving image display views;
obtains, on the basis of coordinates of the four corners of one of the second moving image display views, a pre-reposition position of one of the moving images selected via the operation part;
calculates a post-reposition position of the one of the moving images that has been repositioned via the operation part by reflecting an amount of reposition of the one of the moving images on the coordinates of the four corners of the one of the second moving image display views; and
displays the one of the moving images at the post-reposition position,
wherein if the moving images overlap each other, the one of the moving images which has been selected via the operation part is displayed at a topmost position.

6. The moving image playback device according to claim 5, wherein the operation part is a touch-sensitive surface, and
the control part:
obtains, on the basis of the coordinates of the four corners of the one of the second moving image display views, the pre-reposition position of the one of the moving images selected by a touch operation at one or more points via the operation part;
calculates the post-reposition position of the one of the moving images that has been repositioned by a drag operation which changes a position of the touch operation via the operation part by reflecting the amount of reposition of the one of the moving images based on an amount of reposition by the drag operation on the coordinates of the four corners of the one of the second moving image display views; and
displays the one of the moving images at the post-reposition position.

7. The moving image playback device according to claim 5, wherein the control part:
obtains, on the basis of the coordinates of the four corners of the one of the second moving image display views, a position before magnification or reduction of the one of the moving images selected via the operation part;
calculates a position after magnification or reduction of the one of the moving images that has been magnified or reduced via the operation part by reflecting a magnification/reduction rate of the one of the moving images on the coordinates of the four corners of the one of the second moving image display views; and
displays the one of the moving images at the position after magnification or reduction.

8. The moving image playback device according to claim 5, wherein the operation part is a touch-sensitive surface, and
the control part:
obtains, on the basis of the coordinates of the four corners of the one of the second moving image display views, a position before magnification or reduction of the one of the moving images selected by a touch operation at two or more points via the operation part;
calculates a position after magnification or reduction of the one of the moving images that has been magnified or reduced by a pinch operation which changes a position of at least one point of the touch operation via the operation part by reflecting a magnification/reduction rate of the one of the moving images based on an amount of reposition by the pinch operation on the coordinates of the four corners of the one of the second moving image display views; and
displays the one of the moving images at the position after magnification or reduction.

9. A non-transitory computer readable storage medium which stores a moving image playback program for causing a computer to execute the following:
a procedure for generating a first moving image display view on a display part by an application for moving image playback, wherein the first moving image display view is a pseudo moving image display frame that is unable to play back moving images;
a procedure for generating two or more second moving image display views only on the first moving image display view by the application, wherein the second moving image display views are repositionable only within the pseudo moving image display frame;
a procedure for playing back the moving images on the second moving image display views;
a procedure for obtaining, on the basis of coordinates of the four corners of one of the second moving image display views, a pre-reposition position of one of the moving images selected via an operation part; and
a procedure for calculating a post-reposition position of the one of the moving images that has been repositioned via the operation part by reflecting an amount of reposition of the one of the moving images on the coordinates of the four corners of the one of the second moving image display views, and displaying the one of the moving images at the post-reposition position,
wherein if the moving images overlap each other, the one of the moving images which has been selected via the operation part is displayed at a topmost position.

10. The non-transitory computer readable storage medium according to claim 9, wherein the operation part is a touch-sensitive surface, and the non-transitory computer readable storage medium stores the moving image playback program for causing the computer to execute the following:
a procedure for obtaining, on the basis of the coordinates of the four corners of the one of the second moving image display views, the pre-reposition position of the one of the moving images selected by a touch operation at one or more points via the operation part; and
a procedure for calculating the post-reposition position of the one of the moving images that has been repositioned by a drag operation which changes a position of the touch operation via the operation part by reflecting the amount of reposition of the one of the moving images based on an amount of by the drag operation on the coordinates of the four corners of the one of the second moving image display views, and displaying the one of the moving images at the post-reposition position.

11. The non-transitory computer readable storage medium according to claim 9, wherein the non-transitory computer readable storage medium stores the moving image playback program for causing the computer to execute the following:

a procedure for obtaining, on the basis of the coordinates of the four corners of the one of the second moving image display views, a position before magnification or reduction of the one of the moving images selected via the operation part; and a procedure for calculating a position after magnification or reduction of the one of the moving images that has been magnified or reduced via the operation part by reflecting a magnification/reduction rate of the one of the moving images on the coordinates of the four corners of the one of the second moving image display views, and displaying the one of the moving images at the position after magnification or reduction.

12. The non-transitory computer readable storage medium according to claim 9, wherein the operation part is a touch-sensitive surface, and the non-transitory computer readable storage medium stores the moving image playback program for causing the computer to execute the following:

a procedure for obtaining, on the basis of the coordinates of the four corners of the one of the second moving image display views, a position before magnification or reduction of the one of the moving images selected by a touch operation at two or more points via the operation part; and a procedure for calculating a position after magnification or reduction of the one of the moving images that has been magnified or reduced by a pinch operation which changes a position of at least one point of the touch operation via the operation part by reflecting a magnification/reduction rate of the one of the moving images based on an amount of reposition by the pinch operation on the coordinates of the four corners of the one of the second moving image display views, and displaying the one of the moving images at the position after magnification or reduction.

* * * * *